United States Patent
Hasushita

[11] Patent Number: 6,035,140
[45] Date of Patent: Mar. 7, 2000

[54] FINDER SYSTEM FOR CAMERA

[75] Inventor: Sachio Hasushita, Hokkaido, Japan

[73] Assignee: Asahi Kogaku Kogyo Kabushiki Kaisha, Tokyo, Japan

[21] Appl. No.: 09/037,505

[22] Filed: Mar. 10, 1998

[30] Foreign Application Priority Data

Mar. 11, 1997 [JP] Japan .................................. 9-074496

[51] Int. Cl.[7] .................................................. G03B 13/20
[52] U.S. Cl. ......................... 396/141; 396/373; 396/378; 396/379; 396/380
[58] Field of Search ................................. 396/138, 131, 396/141, 373, 378, 379, 380

[56] References Cited

U.S. PATENT DOCUMENTS

| | | | |
|---|---|---|---|
| 3,041,919 | 7/1962 | Baur et al. ............................... | 396/141 |
| 5,895,131 | 4/1999 | Yano ...................................... | 396/141 |
| 5,907,726 | 5/1999 | Abe et al. ............................... | 396/141 |

FOREIGN PATENT DOCUMENTS

| | | |
|---|---|---|
| 9-015685 | 1/1997 | Japan . |
| 9-015686 | 1/1997 | Japan . |

*Primary Examiner*—Russell Adams
*Attorney, Agent, or Firm*—Greenblum & Bernstein, P.L.C.

[57] ABSTRACT

Disclosed is a finder system for a camera. The finder system has real-image type first and second optical systems apart by a predetermined base length. Light passed through the first and second objective optical systems are combined and superimposed images are formed which is defined within a finder field. The second objective optical system is provided with a rotatable mirror which varies a direction of an optical axis of the second objective optical system with respect to the optical axis of the first objective optical system to vary degree of coincidence of the superimposed images. A rotation angle of the rotatable mirror is controlled based on information related to an object distance and a position within the finder field.

16 Claims, 13 Drawing Sheets

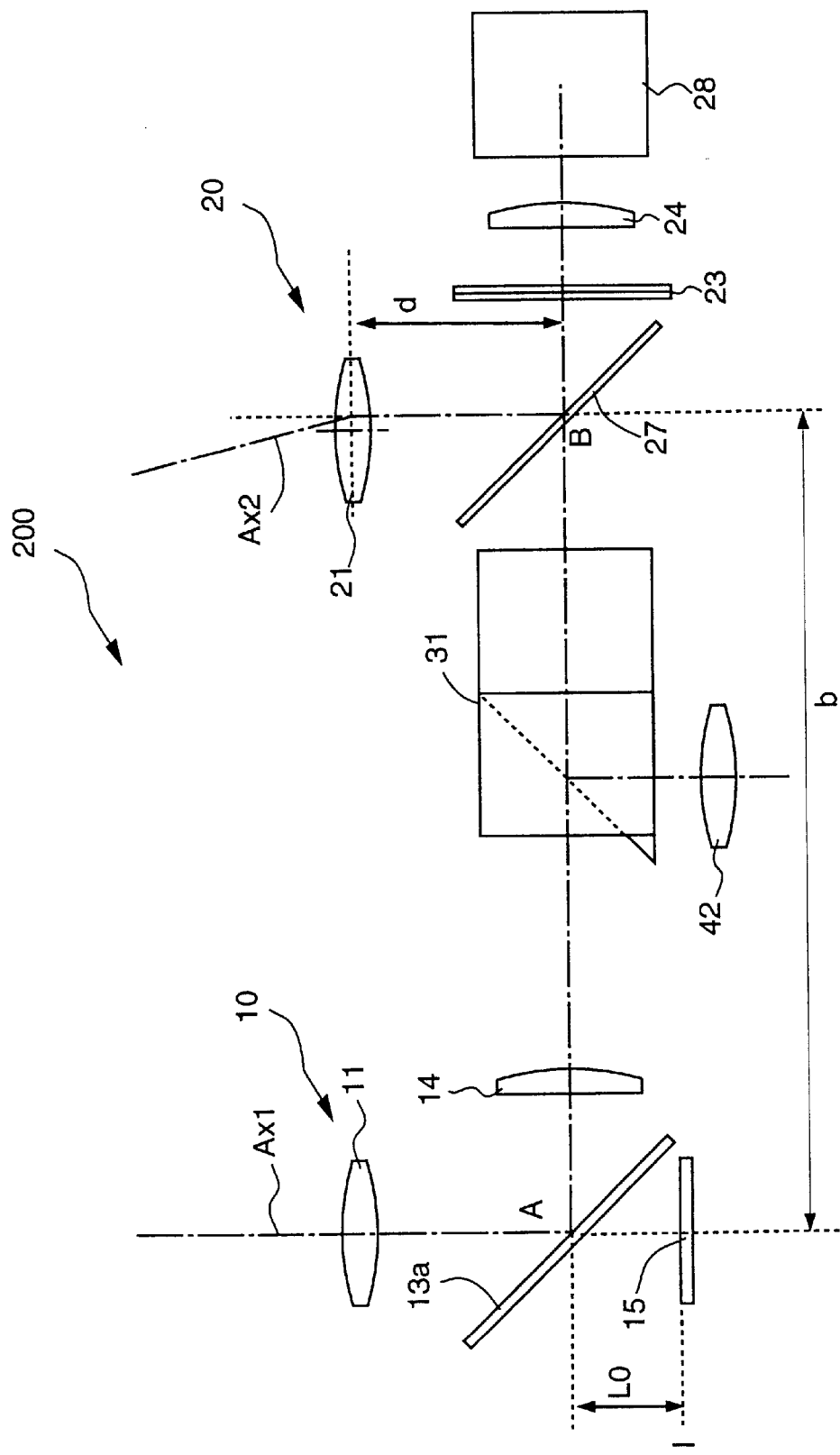

FINDER SYSTEM FOR CAMERA

BACKGROUND OF THE INVENTION

The present invention relates to a finder system of a camera utilizing superimposed two images.

Conventionally, finder systems using superimposed two images have been known as range finder system. The range finder includes first and second objective optical systems for receiving light from an object. The first and the second objective optical systems are located apart from each other by a predetermined base length. Light incident from the first objective optical system and light incident from the second objective optical systems is combined by a beam combiner such as a half mirror, and the combined light is directed to an eyepiece optical system. A photographer can observe an image formed by the first objective optical system and an image formed by the second objective optical system as superimposed via the eyepiece optical system.

One of the objective optical systems, e.g., the second objective optical system is provided with a rotatable mirror which deflects an optical path so as to vary degree of coincidence of the superimposed images along the base length direction. Based on the distance between the first and second objective optical systems, and based on an angle of rotation of the rotatable mirror when the superimposed two images coincide with each other, an object distance can be determined.

Also known is an interlocking type range finer, in which, movement of a photographing lens and rotation of the rotatable mirror is interlocked. Accordingly, when the superimposed images of an object of interest coincide, the photographing lens has been located at an in-focus position with respect to the object.

If the interlocking type range finder is used, even in a camera which has a finder system independent from the photographing lens, it is possible to confirm, through the finder, whether the photographing lens focuses on the object. In other words, it is possible to bring the photographing lens to an in-focus condition while viewing the finder field, and confirm the object of interest is focused.

Generally, the conventional range finder is constructed such that the superimposed images can be observed in only a narrow area within a finder field in order to improve a focusing accuracy, and the position where the superimposed images are observed is fixed at substantially a central portion of the finder field.

However, in the conventional range finder, if the photographer cannot confirm whether an object located at a peripheral portion of a composition of a picture to be photographed will be photographed in in-focus condition since the superimposed images are observed at the central portion of the finder field. In order to ensure that such an object is focused, the photographer has to move a camera so that the object is located at the center of a finder field, and then, after the focusing condition is confirmed, the photographer returns the camera to obtain the intended composition. Thus, in a camera employing the conventional range finder system, photographing in the above-described situation is somewhat troublesome.

SUMMARY OF THE INVENTION

It is therefore an object of the invention to provide a finder system for a camera with which focusing condition of an object observed at any arbitrary portion within a finder field can be readily confirmed.

For the above object, according to the invention, there is provided a finder system for a camera, comprising: a real-image type first objective optical system; a real-image type second objective optical system, the second objective optical system being apart from the first objective optical system by a predetermined base length; a light combining element which composes light passed through the first and second objective optical systems to form superimposed images; an eyepiece optical system which guides light combined by the light combining element to a photographer's eye; an optical path deflection element which varies an angle of an optical axis of the second objective optical system with respect to an optical axis of the first objective optical system to vary degree of coincidence the superimposed images along the base length; a light transmission area defining element which is arranged in an optical path of the second objective optical system, the light transmission area defining element defining an area through which light entered the second objective optical system is allowed to transmit; a dual image area selection device which selects a dual image position, within which the superimposed images are observable, within a finder field, the dual image selection device controls the light transmission area defining element to define the light transmission area at a position corresponding to the dual image area; an object distance information detection device which detects information related to an object distance; and a controller which controls the optical path deflection element so that the superimposed images, which are formed by light incident from the first and second objective optical systems, of the object located at detected object distance coincide with each other based on a position within the finder field of the light transmission area set by the selection device and information related to the object distance output by the object distance information detection device.

As described above, the finder system has real-image type fist and second optical systems apart by a predetermined base length. Light passed through the first and second objective optical systems are combined and superimposed images are formed which is defined within a finder field. The second objective optical system is provided with a rotatable mirror which varies a direction of an optical axis of the second objective optical system with respect to the optical axis of the first objective optical system to vary degree of coincidence of the superimposed images. A rotation angle of the rotatable mirror is controlled based on information related to an object distance and a position within the finder field so that the superimposed images of the object located at the measured distance coincide.

It is preferable that the light transmission area setting element is arranged in the vicinity of an image plane of the second objective optical system.

It is also preferable that the first and second objective optical systems have substantially an identical lens construction.

Optionally, the finder system may further include a magnification changing system which simultaneously varies magnification of the first and second objective optical systems in accordance with a variation of a focal length of a photographing optical system of the camera.

Still optionally, the optical path deflection device may include a rotatable mirror, and a mirror driver for driving the movable mirror to rotate.

Alternatively or optionally, the optical path deflection device may be a variable apical angle prism.

Alternatively, the optical path deflection device may include at least a lens of the second objective optical system movable in a direction perpendicular to an axis which is an optical axis of the second objective optical system when it is not deflected by the optical path deflection element.

In this case, the at least a lens of the objective optical system may be movable in the base length direction.

Further optionally, the light transmission area defining element may be a liquid crystal element, which may be controlled such that a partial area corresponding to the dual image area allows light to pass through, and the other area prevents light from being transmitted.

Yet optionally, the object distance information detection device is a distance measuring device.

Furthermore, a relay lens system may be provided between each of the first and second objective optical systems and the eyepiece optical system, and relays a primary image of an object formed by the first and second objective systems so as to form a secondary image.

In particular case, the camera can be a single lens reflex camera, and the first objective optical system is an objective lens of a photographing optical system of the single lens reflex camera.

In this case, an optical path switching element may be provided between the first objective optical system and the light combining element. The optical path switching element may be movable to be located at a first position and a second position, light incident through the first objective optical system being directed to a photographic recording medium when the optical path switching element is located at the first position, light incident through the first objective optical system being directed to the light combining element when the optical path switching element is located at the second position.

In the above case, the optical path switching element may be a quick return mirror of the single lens reflex camera.

Further optionally, the selection means controls the light transmission area defining element so that light incident from the second objective optical system is transmitted in an overall area of the light transmission area defining element when the optical path switching element is located at the first position. With this control, in the single lens reflex camera, the finder field can be observed even when a quick mirror is retracted.

Still optionally, the finder system may be provided with another optical path deflection element which varies an angle of an optical axis of the second objective optical system with respect to an optical axis of the first objective optical system in a direction perpendicular to a base length direction. With this construction, even when the dual image area is offset from the center of the finder field in a direction perpendicular to the base length direction, the focusing condition can be confirmed accurately.

According to another aspect of the invention, there is provided a finder system for a camera, comprising: a real-image type first objective optical system; a real-image type second objective optical system apart from the first objective optical system by a predetermined base length; a light combining element which combines light passed through the first and second objective optical systems to form superimposed images; an eyepiece optical system for observing images formed by light combined by the light combining element; an optical path deflection element which varies an angle of an optical axis of the second objective optical system with respect to an optical axis of the first objective optical system; a light transmission area setting element for setting an area through which light entered the second objective optical system passes; an object distance information obtaining device which obtains information related to an object distance; and a controller which controls the optical path deflection element to vary the optical axis of the second objective optical system in order for changing degree of coincidence of the superimposed images based on a position of the dual image area and information related to the object distance.

DESCRIPTION OF THE ACCOMPANYING DRAWINGS

Figure 3:
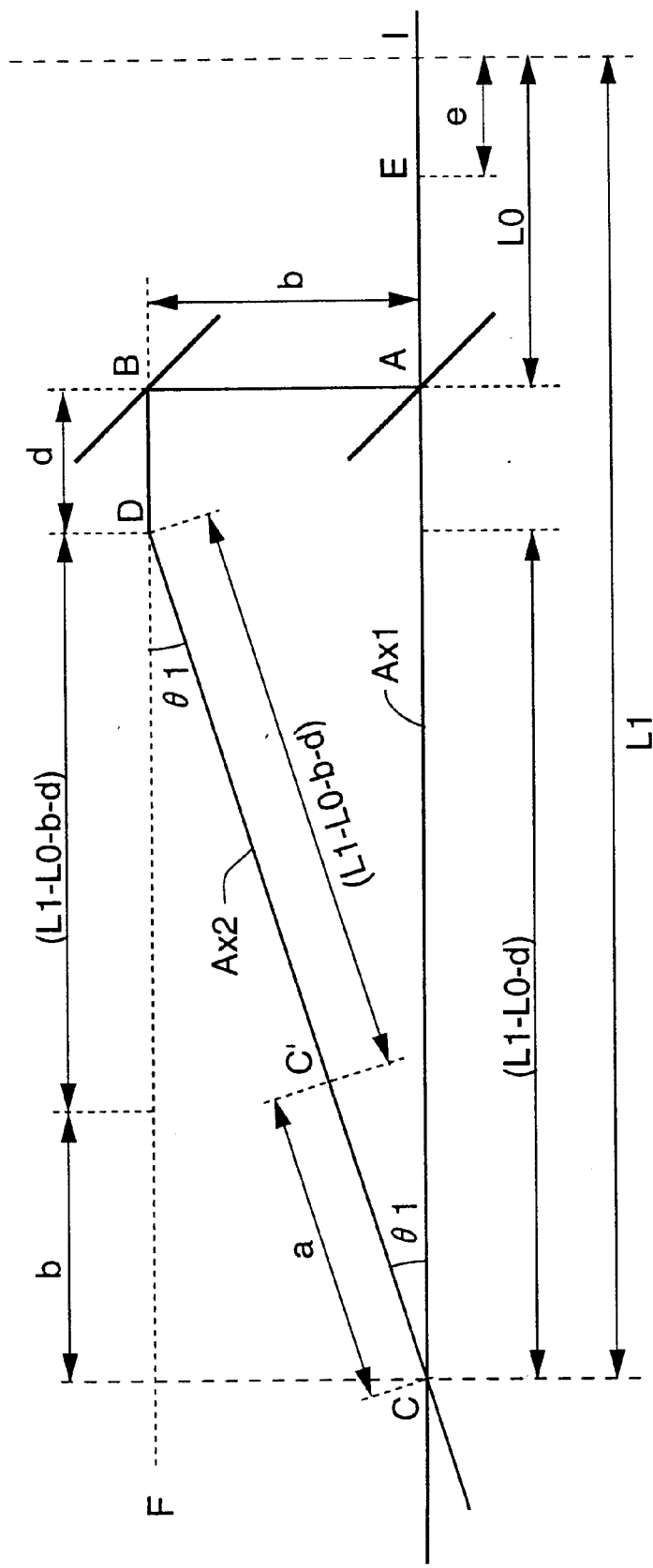
Figure 4:
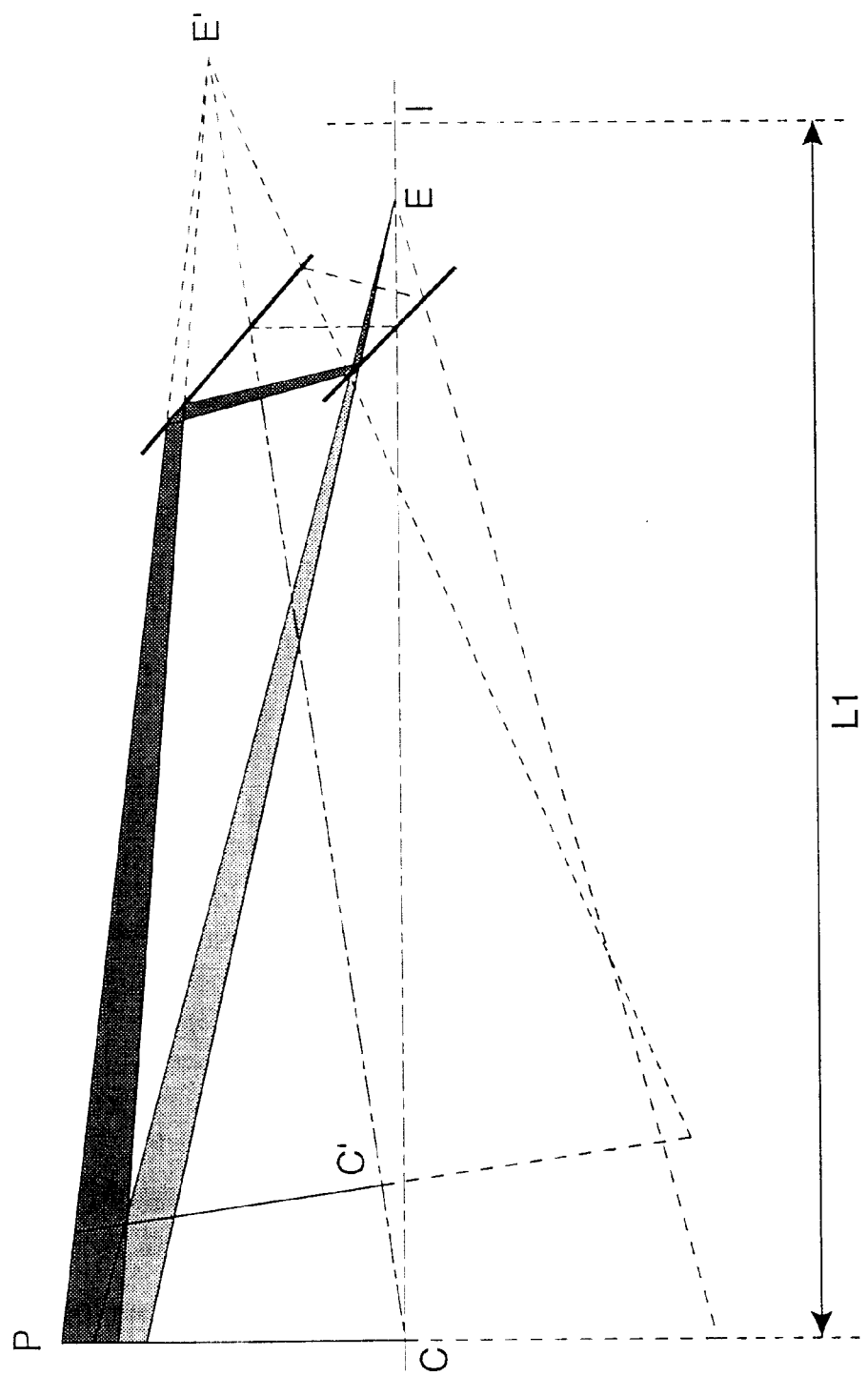
Figure 5:
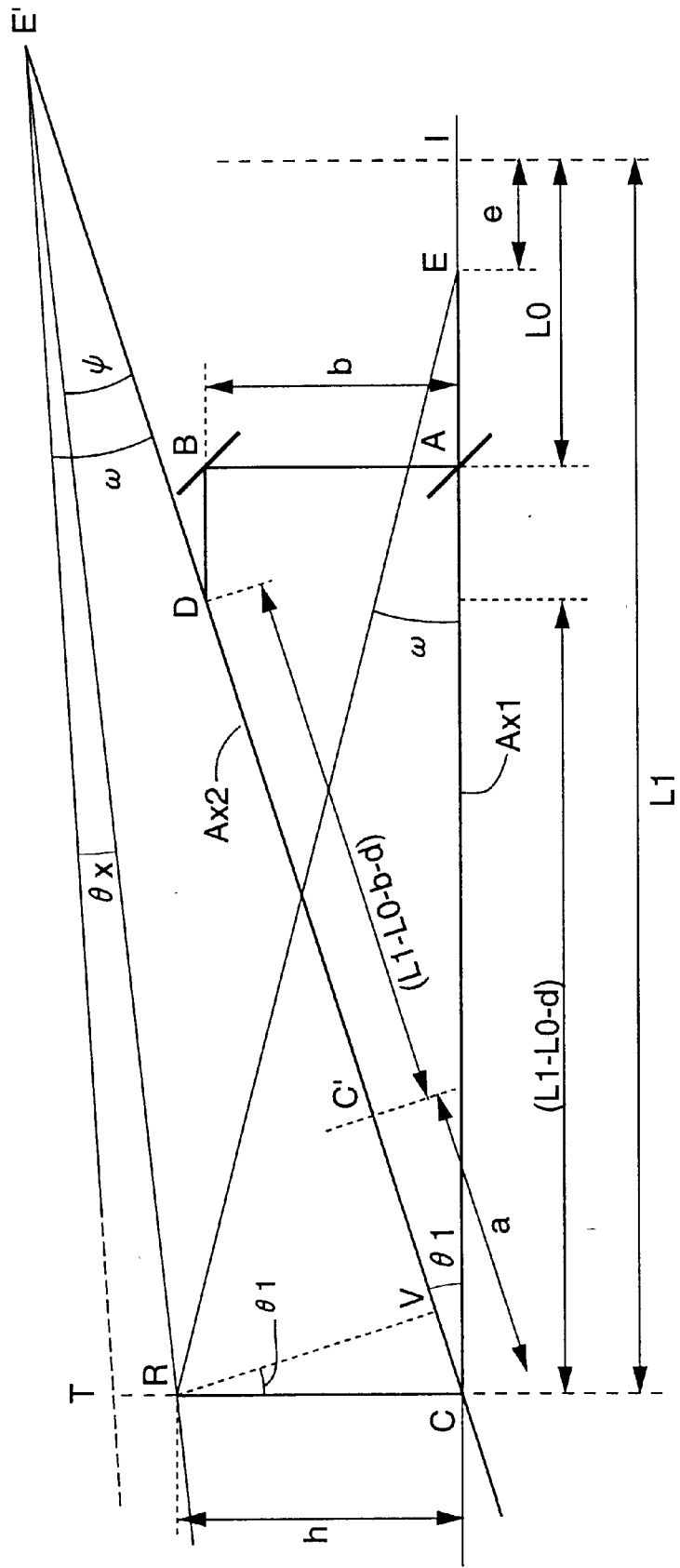
Figure 6:
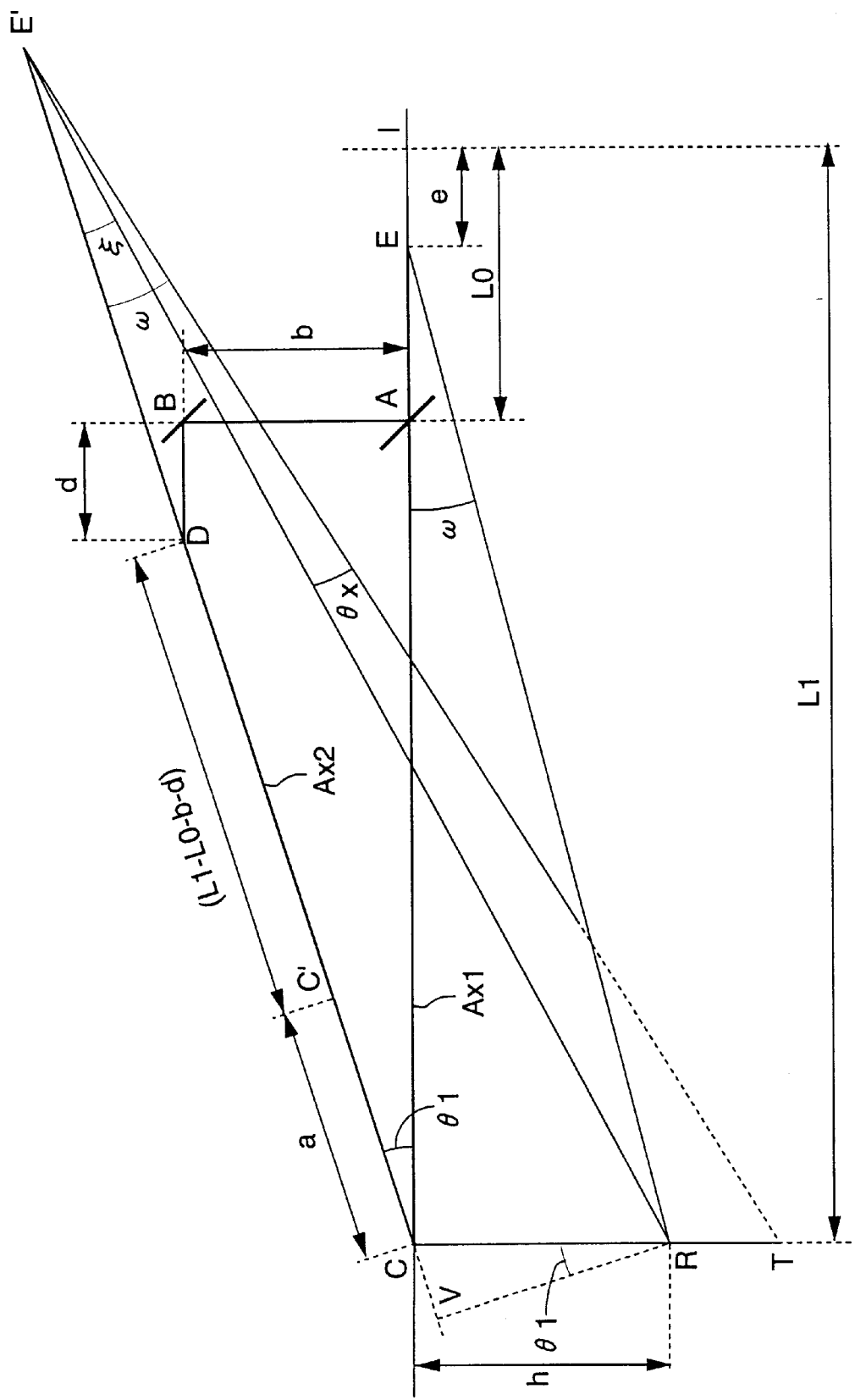
Figure 7A:
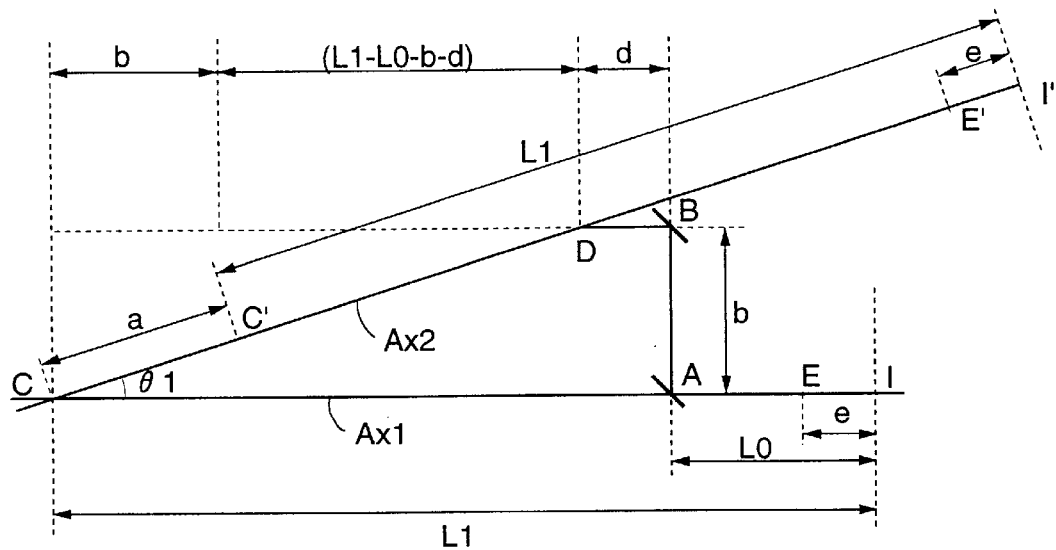
Figure 7B:
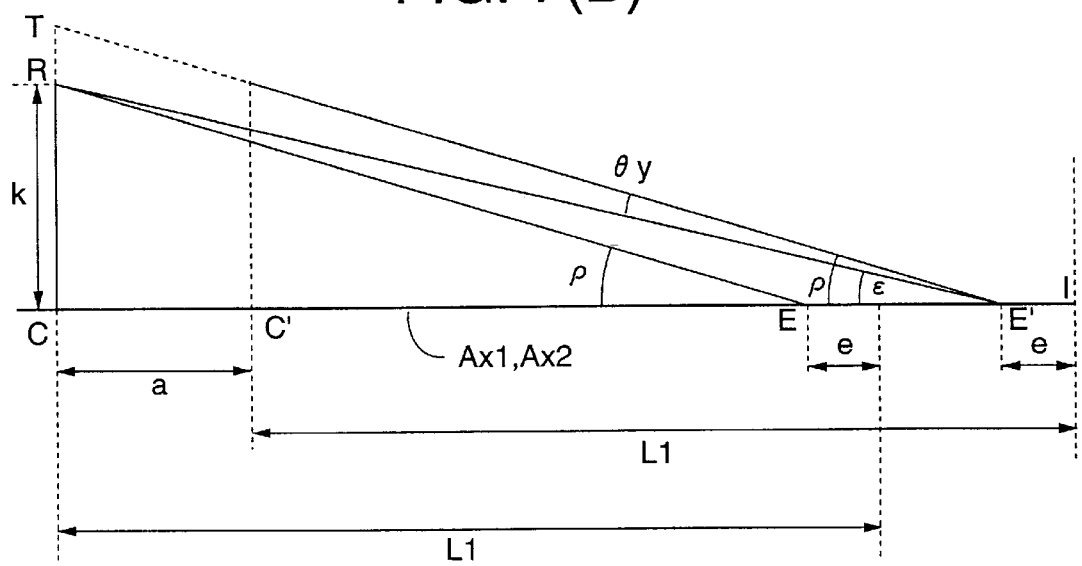
Figure 9:
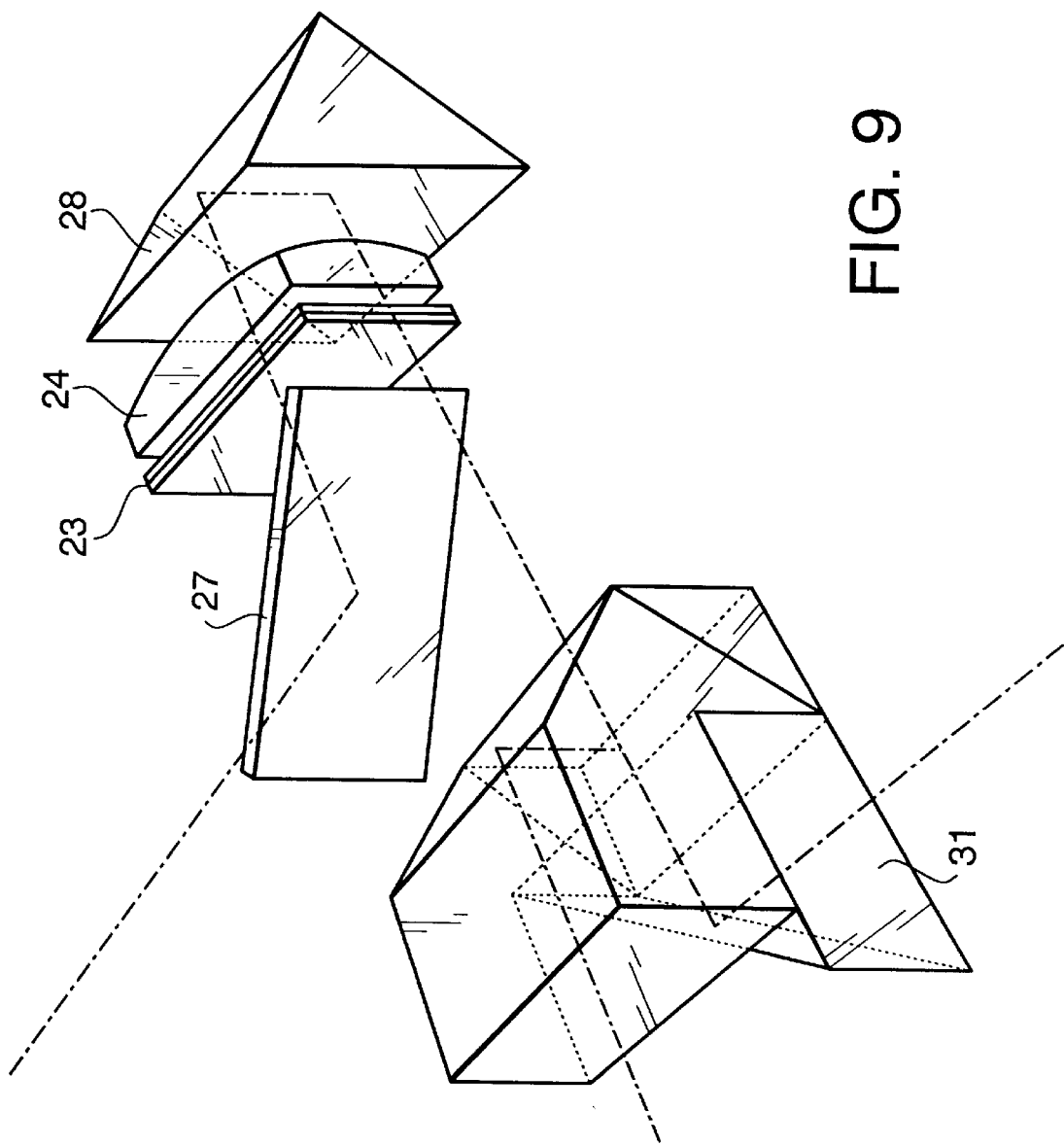
Figure 10A:
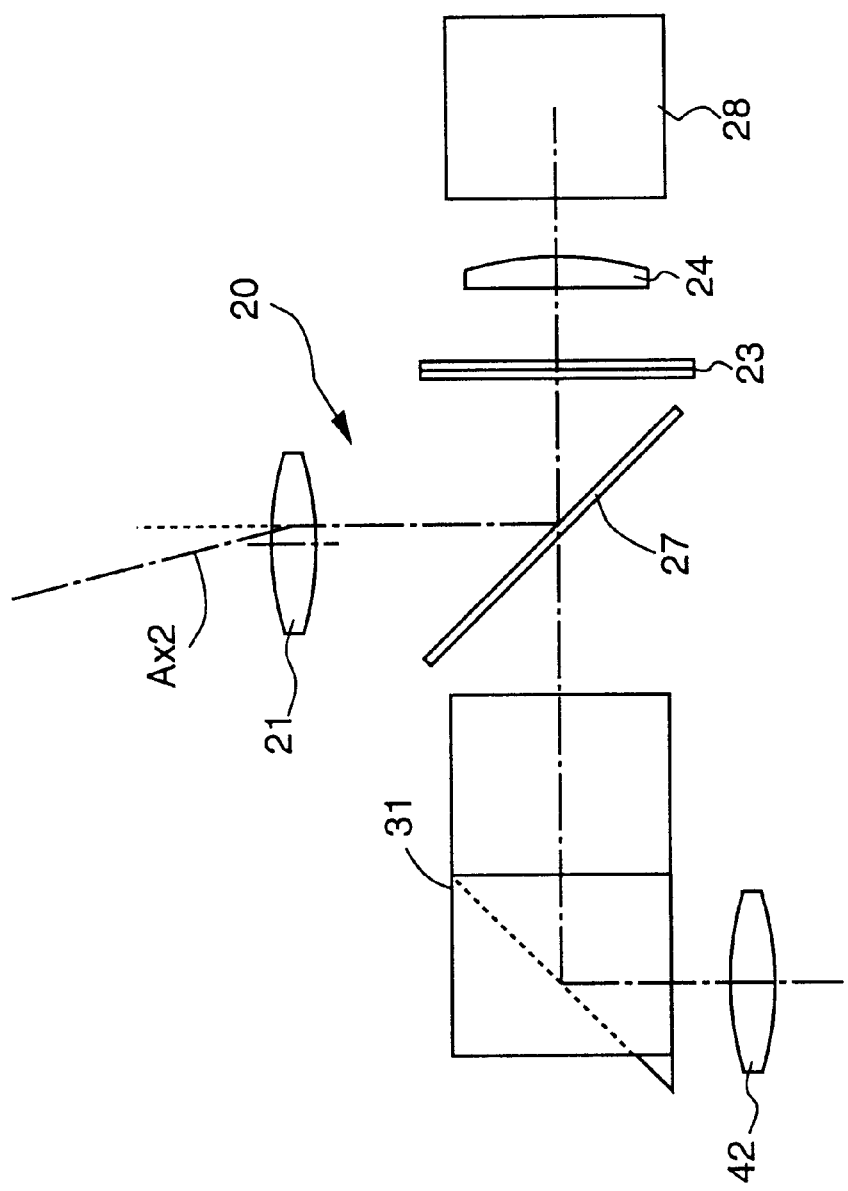
Figure 10B:
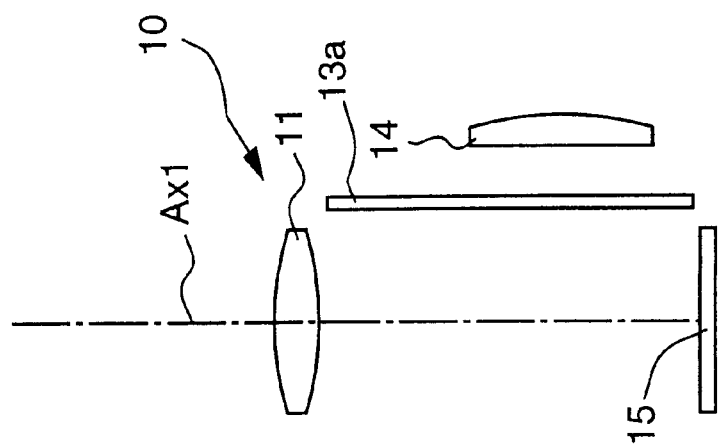
Figure 11:
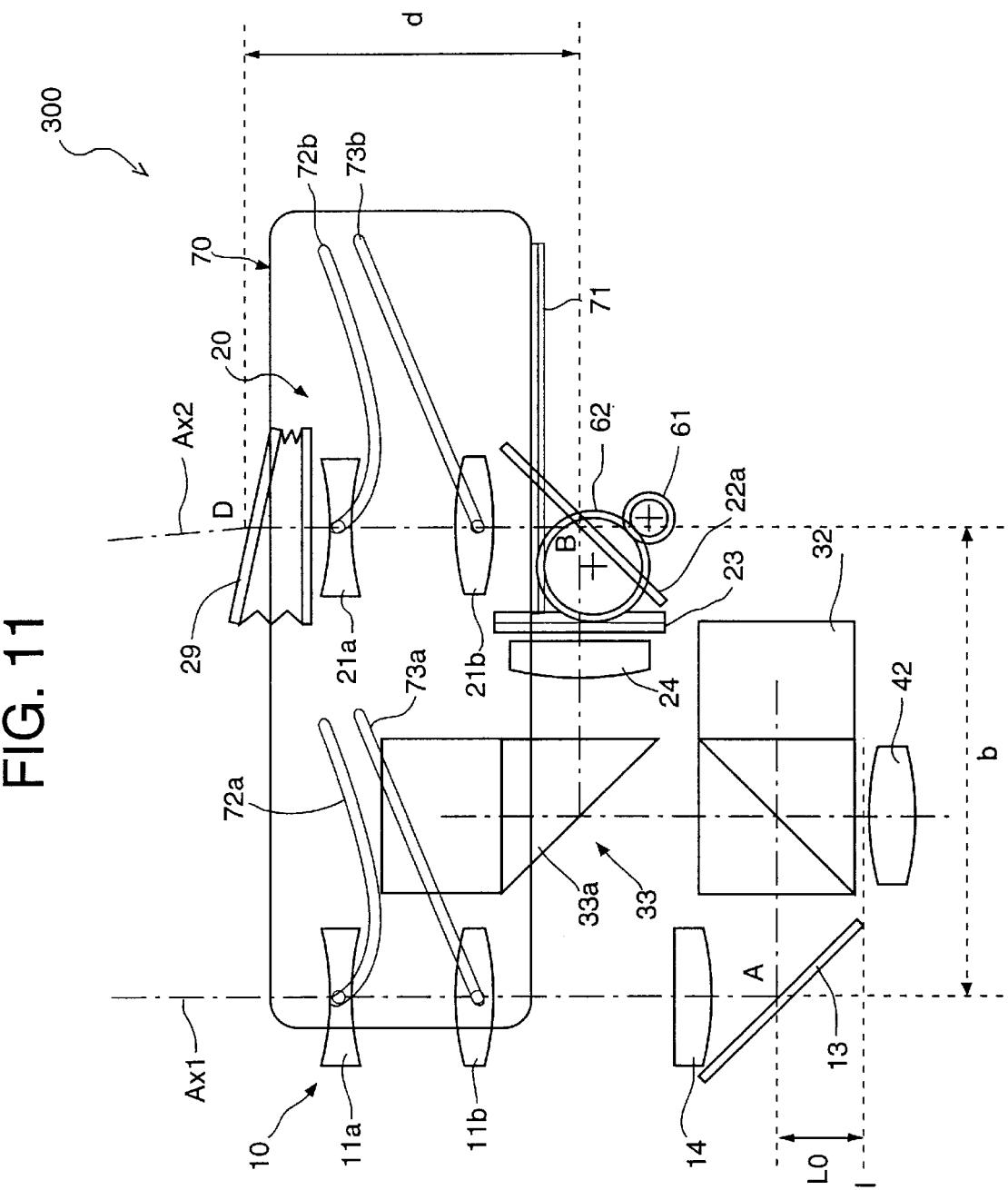
Figure 12:
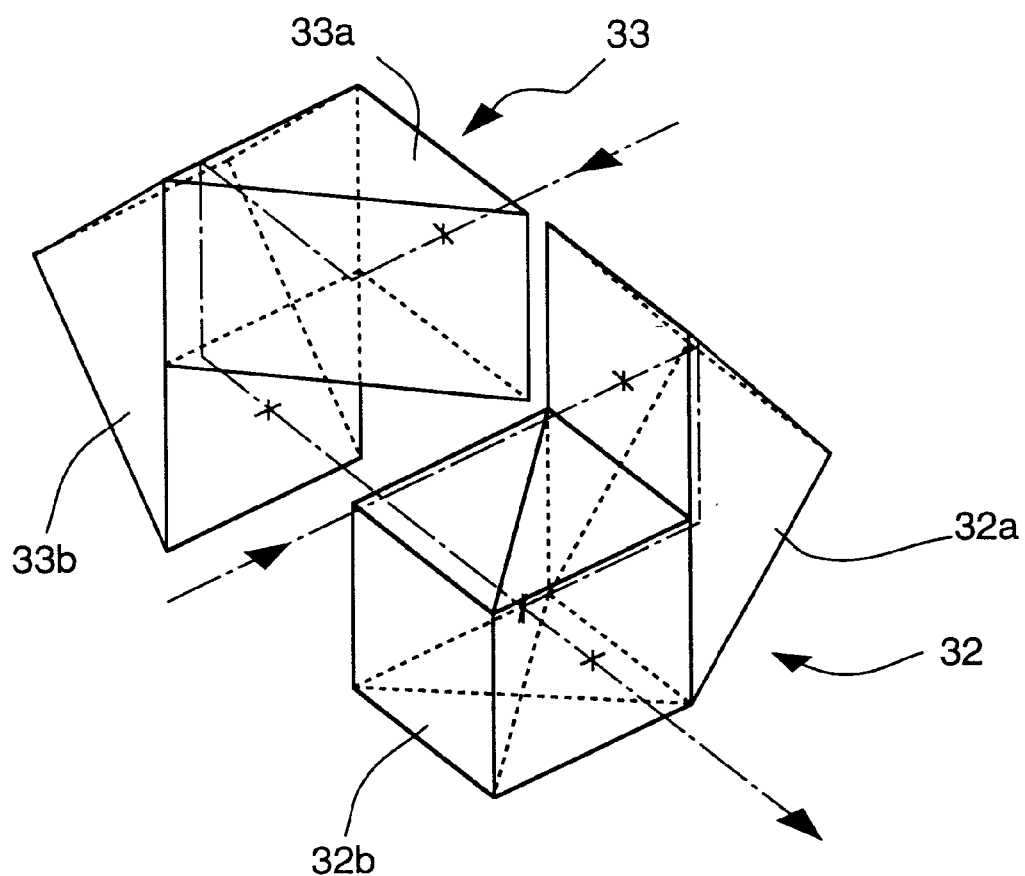
Figure 13:
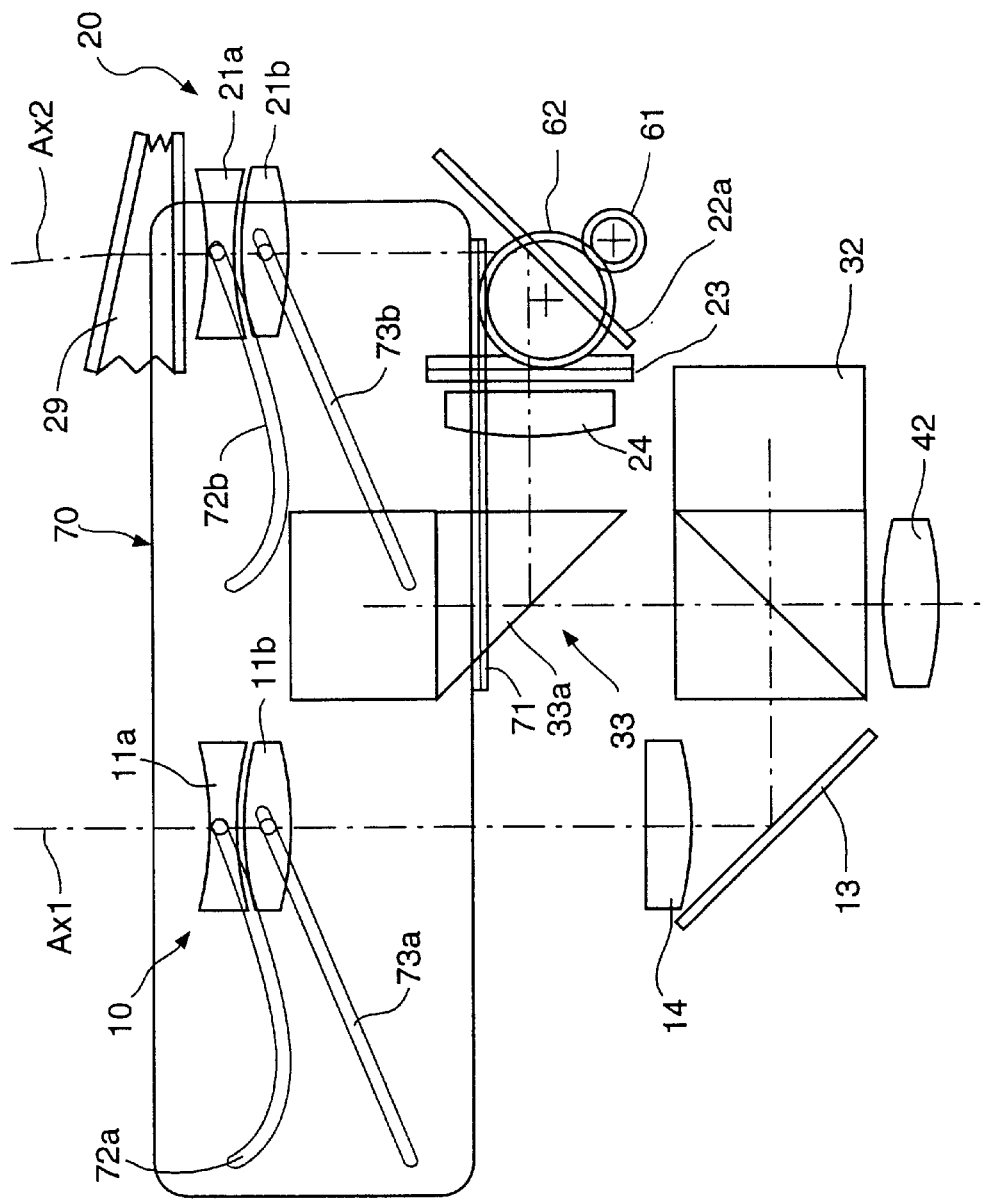

FIG. 3 schematically shows optical paths when a dual image formation area is located at the center of the finder field;

FIG. 4 schematically shows the optical paths when the dual image formation area is located at a position offset from the center of the finder field;

FIG. 5 schematically shows the optical paths when the dual image formation area is offset with respect to the center of the finder field towards the second objective optical system side along a base length direction;

FIG. 6 schematically shows the optical paths when the dual image formation area is offset with respect to the center of the finder field in a direction apart from the second objective optical system along the base length direction;

FIGS. 7(A) and 7(B) show the optical paths when the dual image formation area is shifted with respect to the center of the finder field in a direction perpendicular to a base length direction;

FIG. 8 schematically shows an optical system of a finder system according to a second embodiment of the present invention;

FIG. 9 is a perspective view showing a construction of a prism section of the optical system shown in FIG. 7;

FIGS. 10(A) and 10(B) schematically show the optical system shown in FIGS. 7(A) and 7(B) when a photograph is taken;

FIG. 11 schematically shows a finder according to a third embodiment of the present invention in which lenses are located at wide extremities;

FIG. 12 is a perspective view showing a construction of a prism section of the optical system shown in FIG. 11; and FIG. 13 schematically shows the range finder according to the third embodiment when the lenses are located at tele extremities.

DESCRIPTION OF THE EMBODIMENTS

A finder system for a camera according to preferred embodiments of the present invention will be described hereinafter in detail with reference to the accompanying drawings.

Figure 1:
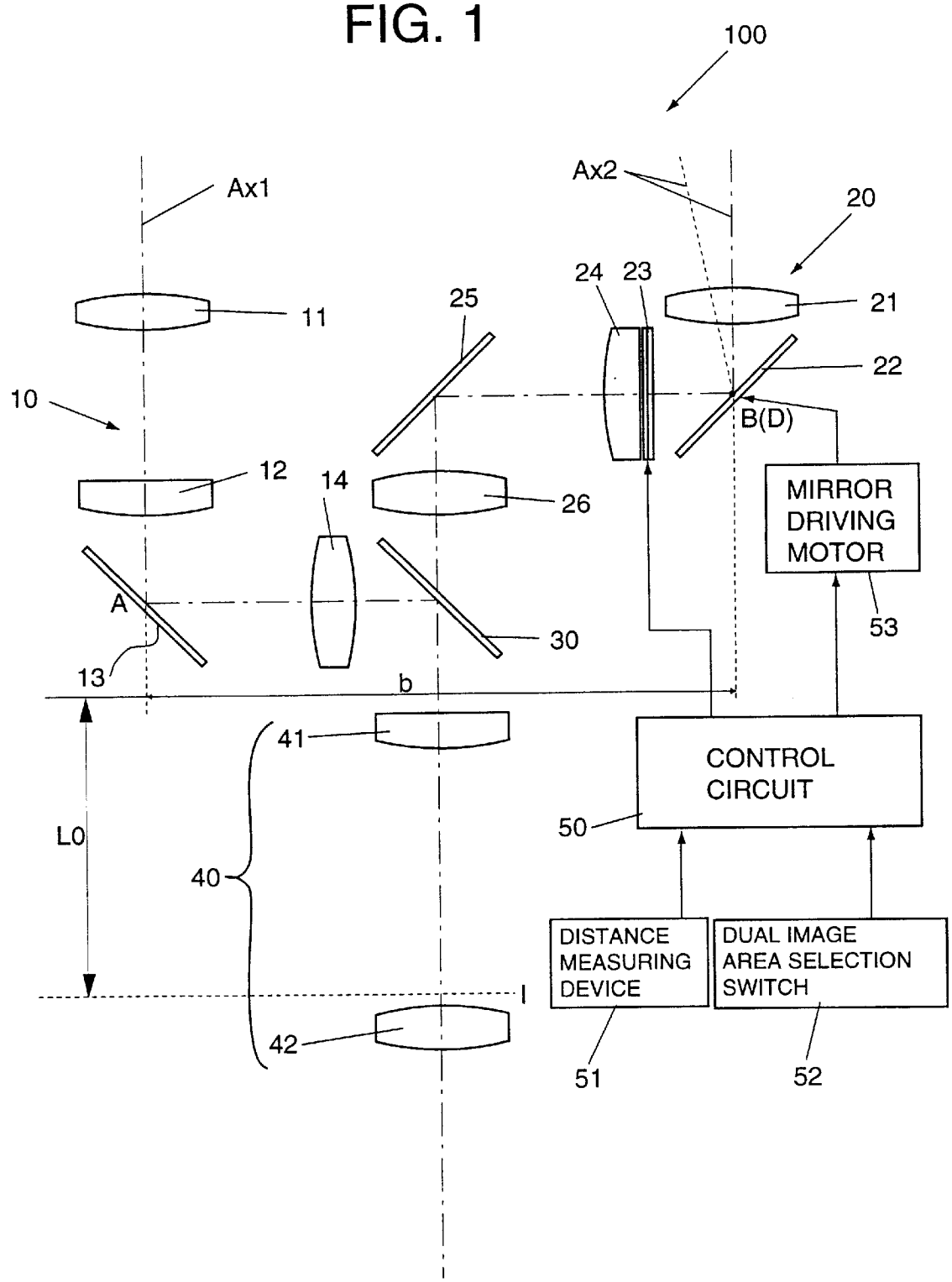
FIG. 1 shows a schematic construction of an optical system associated with a block diagram of a control system of a finder according to a first embodiment of the present invention.
Figure 2A:
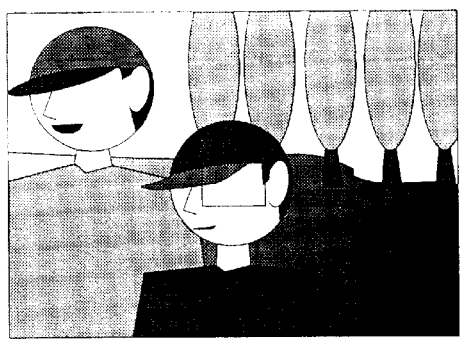
FIGS. 2A–2H show images formed by a first and a second objective optical systems and observed within a finder filed.
Figure 2B:
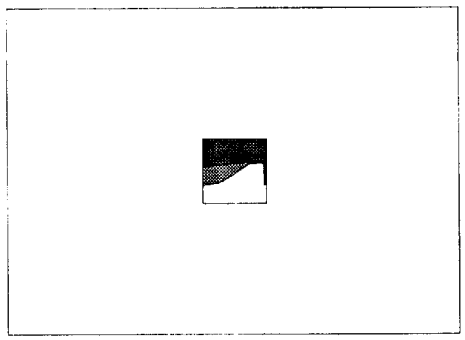
Figure 2C:
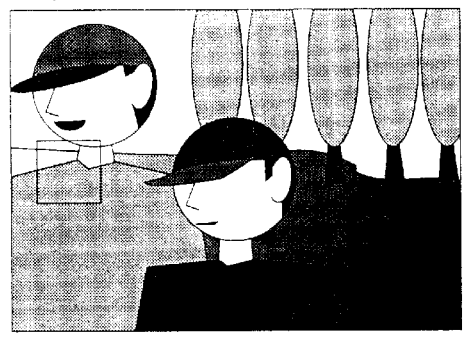
Figure 2D:
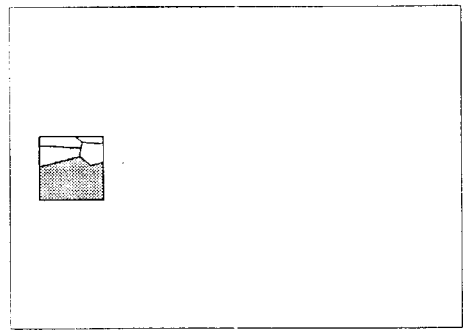
Figure 2E:
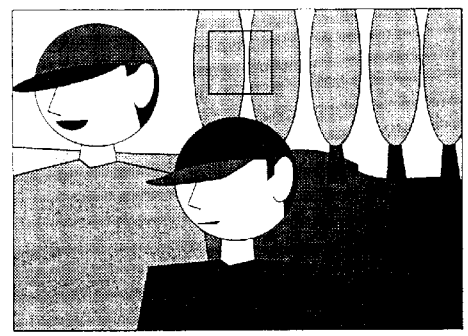
Figure 2F:
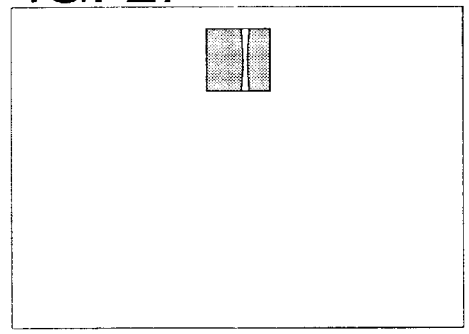
Figure 2G:
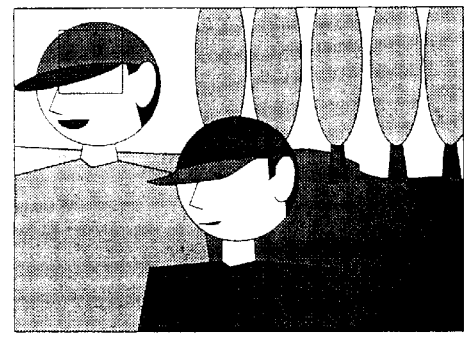
Figure 2H:
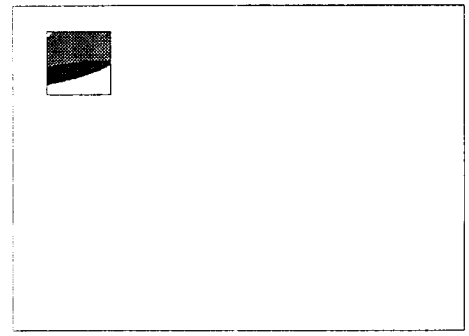

FIG. 1 schematically shows a construction of an optical system and a control system of a finder system 100 according to a first embodiment of the present invention. The finder system 100 is incorporated in a camera (not shown). In the first embodiment, a photographing optical system of the camera is provided independently from the finder system 100. Further, the camera has an automatic focusing function, and a photographing lens of the camera is driven so as to be focused in accordance with an object distance detected by a distance measuring device.

An optical system of the finder system 100 includes:

a real-image type first objective optical system 10;

a real-image type second objective optical system 20 which are apart by a predetermined base length, and views an object at different viewing angles;

a half mirror 30 used as light combining element which combines light incident from the first and second objective optical systems 10 and 20, and forms a dual image (superimposed two images) on a dual image area within a finder field; and an eyepiece optical system 40 for guiding the light combined by the half mirror 30 towards a photographer's eye.

The first objective optical system 10 includes a first lens 11 having an image forming function, a condenser lens 12, and a first mirror 13. The second objective optical system 20 includes a first lens 21 having an image forming function, a condenser lens 24, and a second mirror 25.

A rotatable mirror 22 is rotatably disposed between the first lens 21 and the condenser lens 24 of the second objective optical system 20. The rotatable mirror 22 changes an angle of an optical axis Ax2 of the second objective optical system 20 with respect to an optical axis Ax1 of the first objective optical system as it is rotated. It should be noted that, in this specification, the optical axis of the second objective optical system 20 refers to an optical axis of the second objective optical system extending on the object side of the rotatable mirror 22. Accordingly, the direction in which the optical axis Ax2 extends varies as the rotatable mirror 22 rotates. On the other hand, the optical axis Ax1 is fixed since none of the optical elements of the first objective optical system changes the direction of the optical axis Ax1.

A liquid crystal element 23 is arranged, on the rotatable mirror 22 side of the condenser lens 24, in the vicinity of an image plane of the first lens 21. The liquid crystal element 23 is controlled to define a light transmission area which defines a dual image area. Specifically, an image formed by the light passed through the light transmission area of the liquid crystal element 23 is superimposed on an image formed by the light passed through the first objective optical element 10. Depending on the position of the light transmission area on the liquid crystal element 23, the position, i.e., the dual image area, within the finder field at which the image formed by the first objective optical system 10 and the image formed by the second objective optical system 20 is determined. Further, depending on the size of the light transmission area, the size of the dual image area is determined. In other words, the liquid crystal element 23 defines the size and position of the image formed by the second objective optical system 20 and is superimposed on the image formed by the first objective optical system 10 within the finder field.

Light incident from the first objective optical system 10 covers the entire area of the finder field. The light entered through the first objective optical system 10 is incident on the half mirror 30 via a mirror 13 and a relay lens 14, and a part of the light incident on the half mirror 30 is reflected to form a secondary image, which is guided towards a photographer's eye via a first lens 41 and a second lens 42 of the eyepiece optical system 40.

The light passed through the light transmission area of the liquid crystal element 23 is reflected by a mirror 25, then passes through the half mirror 30 via a relay lens 26 to form a secondary image, which is incident on a photographer's eye via the eyepiece optical system 40. Thus, the photographer can observe the dual image area where the two images are superimposed by the light incident through the first and second objective optical systems 10 and 20. On portions other than the dual image area within the finder field, the photographer can observe a non-superimposed image which is formed only by the light incident through the first objective optical system 10.

The real-image type first objective optical system 10 and the real-image type second objective optical system 20 respectively form primary images, which are inverted images. The primary images formed by the first and second objective optical systems 10 and 20 are re-imaged by relay lenses 14 and 26, and secondary images, which are erected images, are formed within the optical paths thereof. Thus, the photographer can observe erected images through the eyepiece optical system 40.

It should be noted that, the second objective optical system 20 allows the light to pass through only a narrow area (i.e., the light transmission area) corresponding to the dual image area defined within the finder field. Since the dual image area can be defined at an any position within the finder field, the second objective optical system 20 should be able to transmit, at least, the light from any portion within the same viewing field as the first objective optical system 10. Further, since the dual image area may be defined at a peripheral portion of the finder field, it is preferable that a distortion or the like of the second objective optical system 20 coincides with that of the first objective optical system 10 as much as possible.

Therefore, in this embodiment, the first and second objective optical systems 10 and 20 employ the similar lens construction, and the same lens is used for the relay lenses 14 and 26. Because of this structure, the kind of parts constituting the optical systems is reduced, which greatly distributes to a cost reduction.

A rotation angle of the rotatable mirror 22 is controlled by a mirror drive motor 53 which is a stepping motor. As the rotatable mirror 22 is rotated by the mirror drive motor 53, the angle between the first optical axis Ax1 and the second optical axis Ax2 varies, which changes a degree of coincidence of the superimposed two images at the dual image area along the base length direction.

The dual image area, which corresponds to the light transmission area of the liquid crystal element 23, is determined by a control circuit 50 in accordance with an input through a dual image area selection switch 52. The dual image area selection switch 52 is a manually operable switch for selecting an arbitrary position within the finder field at which the dual image is formed. specifically, when the dual image area selection switch 52 is operated, a coordinate representing a position of the center of the dual image area within the finder field is changed. The control circuit 50 controls the liquid crystal element 23 such that a predetermined rectangular area centered around the coordinate set by the dual image area selection switch 52 is made transparent, and the other portions of the liquid crystal element 23 is made opaque portions.

The rotation angle of the rotatable mirror 22, i.e., the driving amount of the mirror drive motor 53 is determined by the control circuit 50 based on an object distance information output by the distance measuring device 51 and a coordinate of the center of the dual image area selected by the dual image area selection switch 52. The control circuit 50 determines an angle of rotation of the rotatable mirror 22 so that two images, observed within the dual image formation area, of an object which is located at the detected object distance coincide with each other, and then, controls the mirror drive motor 53 to rotate the rotatable mirror 22 by the determined angle. It should be noted that, for an object which is not located at the detected distance, the superimposed images do not coincide.

If the dual image area is fixed at the center of the finder field, the rotation angle of the rotatable mirror 22 is determined based only on the information related to the object distance. However, if the center of the dual image area is offset from the center of the finder field, the rotation angle of the rotatable mirror 22 needs to be compensated in accordance with the central coordinate of the dual image area. An operation for compensation will be described later.

The object distance information (i.e., information related to the object distance) outputted from the distance measuring device 51 has been generally used by an automatic focusing device which automatically brings the photographing lens into an in-focus position with respect to the object. In this embodiment, as described above, the object distance information is used as information for determining a rotation angle of the rotatable mirror 22. Therefore, the photographer can confirm, through a finder of a camera, whether or not an object of intent can be focused by automatic focusing.

Specifically, in the finder system according to a first embodiment, the rotatable mirror 22 is controlled such that images of the object located at the determined object distance, and within the dual image area coincide. If the images which coincide are the images of the object of intent, the photographer recognizes that the object can be photographed in an in-focus condition. If the images of the object of intent do not coincide, the photographer recognizes that the intended object cannot be photographed in the in-focus condition. In such a case, the photographer can carry out the focusing operation until the superimposed images of the object of intent coincide. Accordingly, it is ensured that the object of intent can be photographed in the in-focus condition in advance.

In the above embodiment, the distance measuring device 51 is employed for obtaining the distance information to the object. Alternatively or optionally, it is possible to use a position information of the photographing lens which is moved for adjusting the focusing condition, manually or based on the distance information output by the distance measuring device 51. In this case, the rotation amount of the rotatable mirror 22 is determined based on the position information of the photographing lens.

It is also possible to use a defocus information of the photographing lens detected by, for example, a phase-difference focusing condition detecting device, and a current position of the photographing lens in order to determine the rotation angle of the rotatable mirror 22.

In this embodiment, the optical axis Ax2 of the second objective optical system 20 is deflected by the rotatable mirror 22 which is arranged on an image side with respect to the first lens 21. In such a case, a rotation angle of the rotatable mirror 22 should be determined taking a power of the first lens 21 into account. A rotation angle "α" of the rotatable mirror 22 is obtained as follows.

$$g\tan\beta = f\tan\theta 1$$
$$\therefore \beta = \arctan(f\tan\theta 1/g)$$
$$\alpha = \beta/2$$

In the above equations, a distance from the rotatable mirror 22 to a secondary principal point of the first lens is "g", a focal length of the first lens 21 is "f", a rotation angle of the deflected optical axis Ax2 on an object side from the first lens 21 is "θ1", and a rotation angle of an optical axis on the rotatable mirror side from the first lens 21 is "β".

In order to rotate the optical axis Ax2 by θ1, the rotation angle β of the optical axis on the rotatable mirror side from the first lens 21 should satisfy the above equation. As indicated above, the rotation angle "α" of the rotatable mirror 22 is equal to β/2.

Each of FIGS. 2A, 2C, 2E, 2G show an example of the finder field in which light incident through the first and second objective optical systems 10 and 20 has been combined. A small rectangular area indicated in each drawing represents the double image area DE. Each of FIGS. 2B, 2D, 2F and 2H shows an example of a finder field which corresponds only to light incident through the second objective optical system 20. An image formed in a rectangular areas of FIGS. 2B, 2D, 2F and 2H respectively correspond to the images formed in the dual image areas shown in FIGS. 2A, 2C, 2E, 2G.

As shown in FIGS. 2A–2H, the dual image formation areas can be set on an arbitrary position within the finder field, and the rotatable mirror 22 is controlled in accordance with the object distance information and location of the double image area within the finder field. It is possible for the photographer to easily recognize whether the object within the dual image area is focused, from the degree of coincidence of the superimposed images within the double image area in the finder field.

A principle of a method for calculating an angle formed between the optical axes Ax1 and Ax2 of the first and second objective optical systems 10 and 20 will be described hereinafter. In order to simplify the description on the calculation, the calculation principle will be explained on the premise that:

the optical axis Ax1 of the first objective optical system 10 coincide with an optical axis of the eyepiece optical system 40;

an optical axis of the second objective optical system 20 extends from the light combining element in a direction perpendicular to the optical axis of the first objective optical system (i.e., in the base length direction), and in a direction away from the first objective optical system;

a mirror is arranged at a position separated, by the base length, from the light combining element for deflecting the optical axis of the second objective optical system to direct in a direction parallel with the optical axis Ax1 of the first objective optical system;

a deflection element is provided on an object side of the second objective optical system, the light reflected by the mirror being deflected by the deflection element; and the primary images of the object formed by the first and second objective optical systems are re-imaged as secondary images by relay lens systems interposed between either the first or second objective optical systems and the eyepiece optical system.

It should be noted that the optical axis of the second objective optical system on the object side of the deflection element is referred to as the optical axis Ax2.

It should be noted that the rotation angle is calculated in different manners depending on a position of the dual image area within the finder field. Firstly, a case where the dual image is defined at the center of the finder field will be described. Next, a case where the dual image area is shifted from the center toward the second objective optical system side along the base length direction will be described. Further, a case where the dual image area is shifted toward a side opposite to the second objective optical system will be described. Then, lastly, a case where the dual image area is shifted along a direction perpendicular to the base length direction from the center will be described.

First, with reference to FIG. 3, the case where the center of the dual image area is located at the center of the finder field will be described. In FIG. 3, a reference alphabet "I" denotes a predetermined image plane of the photographing optical system, that is, a position of a recording medium (e.g., a film plane), a reference alphabet "E" denotes an entrance pupil position of the first and second objective optical systems, a reference alphabet "A" denotes a position of a light composing element, a reference alphabet "C" denotes a position of an object, a reference alphabet "B" denotes a position of the last mirror of the second objective optical system, a reference alphabet "D" denotes a position of an optical path deflection element, a reference alphabet "F" denotes a position through which the optical axis of the second objective optical system passes when the optical axis of the second objective optical system is not deflected by the optical path deflecting element, and is parallel with the optical axis of the first objective optical system, and a reference alphabet "C'" denotes a position of the object which would be observed by the second objective optical system at the same magnification as the case where the object located at C is observed by the first objective optical system.

When the angle $\theta 1$ is formed between the two optical axes Ax1 and Ax2 of the first and second objective optical systems for making the images of the object at the position C coincide within the dual image area, the following equation (1) should be satisfied.

$$\theta 1 = \arctan(b/(L1-L0-d)) \quad (1)$$

where, b is the base length;

L1 is a distance from the predetermined image plane "I" to the object "C" (which is equivalent to an object distance in a photographing system);

L0 is a distance from the predetermined image plane "I" to the light combining element "A"; and d is a distance from the last mirror "B" of the second objective optical system to the optical path deflecting element "D".

Further, an interval between positions where an object can be observed through the first and second objective optical systems at the same magnification, that is, a distance "a" between positions C and C' is obtained from the following equation (2).

$$(L1-L0-d)/(a+L1-L0-b-d) = \cos\theta 1 \therefore a = (L1-L0-d)/\cos\theta 1 - (L1-L0-b-d) \quad (2)$$

In the above equation (1), the base length b, the distances L0 and d are constant for a particular system configuration. Accordingly, the angle $\theta 1$ formed between the two optical axes Ax1 and Ax2 is determined depending on only the distance L1 from the predetermined image plane "I" to the object "C", which is an only variable factor. The distance L1 is calculated on the basis of an output of the distance measuring device or a focus position of the photographing lens.

Therefore, when the rotatable mirror (i.e., the deflection element) is controlled in accordance with the angle $\theta 1$ determined by the above equation (1), and if the superimposed images, which are observed on the dual image area, of the object located at the position C are coincide, the photographer can recognize that object distance is detected correctly or that the photographing lens is focused on the object, through the finder. On the contrary, if distance measuring is not accurately carried out or the photographing lens is not focused on the object, the superimposed images of the object "C" do not coincide. In this case, the photographer can confirm that the object of intent cannot be focused through the finder, prior to actually carrying out photographing.

If the dual image area is not located at the center of the finder field, the angle $\theta 1$ determined from equation (1) should be compensated. The reason will be described hereinafter. In the following description, similar to the above, the angle $\theta 1$ is formed between the two optical axes Ax1 and Ax2 of the first and second objective optical systems when the optical axes Ax1 and Ax2 cross at the position C where the object is located, and the distance to the object "C" with respect to the film plane "I" is L1.

In this case, if the dual image area is defined at a position offset from the center of the finder field in the base length direction, i.e., if the dual image area is defined at a position apart from the optical axis of the first objective optical system in the base length direction, as shown in FIG. 4, a portion of the object from which light corresponding to the dual image area is incident on the first objective optical system (i.e., a lightly colored portion in the drawing) does not coincide with a portion of the object from which light corresponding to the dual image area is incident on the second objective optical system (i.e., a dark colored portion in the drawing).

It should be noted that, in FIG. 4, a reference alphabet "E'" denotes a position of an entrance pupil when the optical path of the second objective optical system, which is folded by the mirrors, is developed. In this case, the distance between points E and C is equal to the distance between points E' and C'. Therefore, even if accurate distance measuring has been carried out or the photographing lens is focused on the object, the images of the object at the measured distance observed within the dual image area do not coincide. Thus, when the dual image area is offset from the center of the finder field, it is insufficient to determine the rotation angle of the rotatable mirror based on the equation (1). If only equation (1) is used, it is difficult to confirm the focusing condition.

In order to solve the above problem, the angle formed by two optical axes Ax1 and Ax2 is determined based on not only the distance L1, but also the coordinate of the dual image area within the finder field.

It should be noted that, if a ratio of the area of the dual image area to the overall area of the finder field is relatively large, the superimposed images may be observed as shifted at the peripheral portion of the dual image area even though the angle between the two optical axes is determined taking the coordinate of the double image range.

Referring now to the example shown in FIG. 4, an area of the object from which the light is incident onto the second objective optical system is greater than an area of the object from which the light is incident on the first objective optical system. Therefore, the wider the dual image area is, the greater the shift between the images at the peripheral portion of the dual image area is. Such a condition is caused by a parallax between the first and second objective optical systems, and a difference of magnification due to difference of distances from the entrance pupil to the object. Accordingly, it does not affect the accuracy of confirmation of the in-focus condition if the distance L1 is sufficiently long with respect to the base length, even though the above condition is ignored. However, if the distance L1 is relatively short, it is difficult to confirm the in-focus condition accurately.

Next, a calculation method of an angle formed between the two optical axes Ax1 and Ax2 when the dual image area is shifted from the center of the finder field will be described.

FIG. 5 is an explanatory view showing an optical path in the case where the dual image area is shifted from the center of the finder field toward the second objective optical system side along the base length direction. Similar to the case of FIG. 3, in FIG. 5, an object is located at the position C along the optical axis Ax1 of the first objective optical system. In this case, the center of the dual image area is located at a point "R" having a height "h", on a plane (which will be referred to as an objective plane, hereinafter) crossing point "C" and perpendicular to the optical axis Ax1 of the first objective optical system, with respect to the optical axis Ax1.

An angle formed between a line viewing the point R from the entrance pupil E via the first objective optical system and the optical axis of the first objective optical system (i.e., a real field of view) is represented by $\omega$, and the angle formed between two optical axes Ax1 and Ax2 of both objective optical systems is represented by $\theta 1$ when the superimposed images of the object C coincide within the dual image area. In this case, a line, which extends from the entrance pupil position E' on the developed optical path forming the angle $\omega$ with respect to the optical axis of the second objective optical system, passes through a point "T" which is outside the point "R" on the objective plane. Thus, the light enters the dual image area through the first objective optical system forms an image of a portion of the object centered around the point R. If no compensation is made, the light directed to the dual image area through the second objective optical system forms an image of a portion of the object centered around the point T.

In order to make the light directed to the dual image area via the second objective optical system form an image of a portion of the object centered around the point R, the following compensation is required. Specifically, an angle formed between the optical axes Ax1 and Ax2 is compensated to ($\theta 1+\theta x$) so that the angle formed between the line extending from the entrance pupil E' to the point R and the optical axis Ax2 of the second objective optical system forms an angle $\phi$. In this case, the height h of the point R with respect to the optical axis Ax1 of the first objective optical system on the objective plane is obtained from the following equation.

$$\tan \omega = h/(L1-e) \therefore h=(L1-e) \tan \omega$$

where L1 is a distance between the image plane "I" and the objective plane (i.e., point "C"), and e represents a distance between the entrance pupil "E" of the first objective optical system and the image plane "I".

With respect to a triangle $\Delta$RVC, V being a foot of a line extending from the point R and normal to the optical axis Ax2, the following relations are obtained.

$$RV = h\cos\theta 1$$

$$VC = h\sin\theta 1$$

$$\therefore VC' = a - VC$$

$$= a - h\sin\theta 1$$

With respect to a triangle $\Delta$RVE', the following relationship is obtained.

$$\tan \phi = (h \cos \theta 1)/(L1-e+(a-h \sin \theta 1)) \therefore \phi = \arctan (h \cos \theta 1)/(L1-e+(a-h \sin \theta 1))$$

The compensation angle $\theta x$ is obtained from $\omega-\phi$. Thus, by substituting the above relationship, the compensation angle $\theta x$ is obtained by the following equation (3).

$$\theta x = \omega - \arctan (h \cos \theta 1)/(L1-e+(a-h \sin \theta 1)) \tag{3}$$

As described above, the angle $\theta 1$ formed between the optical axes Ax1 and Ax2 is obtained as a function of the distance L1, and the compensation angle $\theta x$ is obtained as a function of the distance L1 and the real field of view $\omega$ as indicated in the above equation (3). Therefore, if the angle to be formed between the two optical axes is determined on the basis of the aforesaid two values, $\theta 1$ and $\theta x$, even if the dual image area is defined at a position shifted from the center of the finder field in the base length direction, the superimposed images of the object located at the detected object distance or on the object distance where the photographing lens is focused, coincide.

Therefore, even if the dual image area is shifted from the center of the finder field in the base length direction, toward the second objective optical system, it is possible to confirm that focusing will be accurately carried out or the photographing lens is brought into an in-focus condition, from the degree of coincidence of the superimposed images via the finder.

FIG. 6 shows an optical path when the dual image area is shifted from the center of the finder field away from the second objective optical system along the base length direction. Similar to the case of FIG. 5, in FIG. 6, an object is located at the position C along the optical axis of the first objective optical system. In this case, a point "R" having a height "h", on the objective plane with respect to the optical axis Ax1 of the first objective optical system is defined as the center of the dual image area.

An angle formed between a line viewing the point R from the entrance pupil E via the first objective optical system and the optical axis Ax1 of the first objective optical system is represented by $\omega$, and the angle formed between two optical axes Ax1 and Ax2 of both objective optical systems is represented by $\theta 1$ when the superimposed images of the object at C in the dual image area coincide.

In this case, a line, which extends from the entrance pupil position E' on the developed optical path forming the angle $\omega$ with respect to the optical axis Ax2 of the second objective optical system, passes through a point "T" which is outside the point "R" on the objective plane. The light enters the dual image area through the first objective optical system forms an image of a portion of the object centered around the point R. If no compensation is made, the light directed to the dual image area through the second objective optical system forms an image of a portion of the object centered around the point T.

In order to make the light directed to the dual image area via the second objective optical system form an image of a portion of the object centered around the point R, the following compensation is required. Specifically, an angle $\theta 1$ formed between the optical axes Ax1 and Ax2 is compensated to ($\theta 1-\theta y$) so that the angle formed between the line extending from the entrance pupil E' to the point R and the optical axis Ax2 of the second objective optical system forms an angle $\xi$.

With respect to a triangle $\Delta$RVC, V being a foot of a line normal to the optical axis Ax2 and extending from the point R, the following relations are obtained.

$$RV = h\cos\theta 1$$

$$VC = h\sin\theta 1$$

$$\therefore VC' = a + VC$$

$$= a + h\sin\theta 1$$

With respect to a triangle $\Delta RVE'$, the following relationship is obtained.

tan $\xi=(h \cos \theta 1)/(L1-e+(a+h \sin \theta 1))$ ∴$\xi$=arctan $(h \cos \theta 1)/(L1-e+(a+h \sin \theta 1))$ The compensation angle $\theta x$ is obtained from $\omega - \xi$. Thus, by substituting the above relationship, the compensation angle $\theta x$ is obtained as indicated in equation (4).

$$\theta x = \omega - \arctan (h \cos \theta 1)/(L1-e+(a+h \sin \theta 1)) \qquad (4)$$

As described above, the angle $\theta 1$ formed between the two optical axes Ax1 and Ax2 is obtained as a function of the distance L1, and the compensation angle $\theta x$ is obtained as a function of the distance L1 and the real view of field $\omega$ as indicated in the above equation (4). Therefore, if the angle to be formed between the two optical axes Ax1 and Ax2 is determined on the basis of the aforesaid two values, $\theta 1$ and $\theta x$, even if the dual image area is defined at a position shifted from the center of the finder field, in the direction away from the second optical objective system along the base length direction, the superimposed images of the object located at the detected object distance or located at the object distance where the photographing lens is focused, is observed to coincide.

Therefore, even if the dual image area is shifted from the center of the finder field in the direction away from the second objective optical system, it is possible to confirm that focusing will be accurately carried out or the photographing lens is brought into an in-focus condition, from the degree of the coincidence of the superimposed images, via the finder.

FIG. 7(A) and FIG. 7(B) show an optical path when the dual image area is shifted along a direction perpendicular to the base length direction with respect to the center of the finder field. FIG. 7(A) shows the optical path in a plane including both optical axes Ax1 and Ax2, and FIG. 7(B) shows an optical path in a plane perpendicular to the plane including both optical axes Ax1 and Ax2, where a position corresponding to a real view of field $\rho$ is defined as the center of the dual image area. Like the case of FIG. 3, in FIGS. 7(A) and 7(B), an object is located at the position C along the optical axis Ax1 of the first objective optical system, and a point "R" of a height (distance) "k" with respect to the optical axis Ax1 of the first objective optical system on the objective plane perpendicular to the optical axis Ax1 of the first objective optical system is determined as the center of the dual image area.

An angle formed between a line extending toward the point R from the entrance pupil E via the first objective optical system and the optical axis Ax1 of the first objective optical system is represented by $\rho$, and the angle formed between the two optical axes Ax1 and Ax2 of both objective optical systems is represented by $\theta 1$ in order to make the superimposed images of the object located at position C coincide at the center of the finder field. In this case, a line, which extends from the entrance pupil position E' on the developed optical path at the angle $\rho$ with respect to the optical axis Ax2 via the second objective optical system, passes through a point "T" outside the point "R" on the object plane in a direction perpendicular to the base length direction.

In order to make the light directed to the dual image area via the second objective optical system form an image of a portion of the object centered around the point R, the following compensation is required. Specifically, an angle formed between the two optical axes Ax1 and Ax2 in the direction perpendicular to the base length direction is set to $\theta y$ so that the angle formed between the line extending from the entrance pupil E' to the point R and the optical axis Ax2 of the second objective optical system forms an angle $\epsilon$. With respect to a triangle $\Delta ERC$ of FIG. 7(B), a distance "k" from optical axes Ax1 and Ax2 on the objective plane to the point R is obtained as follows.

tan $\rho=k/(L1-e)$ ∴ $k=(L1-e)$ tan $\rho$

The angle $\epsilon$ of a ray passing through the point R via the second objective optical system with respect to the optical axis is obtained from the following equation.

tan $\epsilon=k/(L1-e+a)$∴=arctan $(k/(L1-e+a))$

The compensation angle $\theta y$ is obtained from the relation of $\rho-\epsilon$, and therefore, the compensation angle $\theta y$ is obtained from the following equation (5).

$$\theta y = \rho - \arctan (k/(L1-e+a)) \qquad (5)$$

It should be noted that, when the center of the dual image area is shifted from the center of the finder field in the direction perpendicular to the base length direction as shown in FIGS. 7(A) and 7(B), and a mirror is used as the optical path deflection element, if the compensation angle $\theta y$ is simply effected to compensate a deflection angle of the mirror, and the optical axis is deflected in the direction perpendicular to the base length with use of the mirror, the image formed by the second objective optical system rotates. Therefore, in this case, in addition to a mirror, which deflects the optical path of the second objective optical system only in a base length direction, a variable apical angle prism may be used to deflect the optical path in the direction perpendicular to the base length direction. Alternatively or optionally, a lens may be arranged to be decentered so that the optical path is deflected in the direction perpendicular to the base length direction.

If the dual image area is shifted from the center of the finder field in both of the base length direction and the direction perpendicular to the base length direction, that is, in a slanting direction, compensation can be made by combining the compensation on the base length direction shown in FIG. 5 and FIG. 6 and the compensation in the direction perpendicular to the base length direction shown in FIGS. 7(A) and 7(B). By making the compensation as described above, even if the dual image area is located on positions other than the center of the finder field, it is possible to accurately monitor the in-focus condition of the photographing system from the degree of coincidence of the superimposed images. Further, in practical use, if the distance L1 to the object is considerably longer as compared with the base length b, it is possible to calculate a compensation angle using approximation in a part of the above equations (3), (4) and (5).

The above-described image plane "I", positions "A", "B", "C", the base length "b", the distances "L0" and "d" in actual constructions are indicated in FIGS. 1, 8 and 11.

FIG. 8 to FIGS. 10(B) show a construction of an optical system of a finder system 200 according to a second embodiment of the present invention. In this embodiment, a first objective optical system 10 is used also as a photographing system, and the camera is constructed as a single lens reflex camera in which light incident through a photographing lens is guided to the finder. FIG. 8 shows an optical path when light is introduced in a finder system 200, FIG. 9 is a perspective view showing principal parts of the finder system 200, and FIGS. 10(A) and 10(B) show an optical path when a photographing is carried out.

When an object is viewed, as shown in FIG. 8, light incident through a first lens 11 of the first objective optical system 10, which is a photographing lens, is reflected by a quick return mirror 13a, and then, is incident, via a condenser lens 14, on a compound prism 31 which functions as a light combining element.

Light incident through a first lens 21 of a second objective optical system 20 is deflected at right angles by a mirror 27, passed through a liquid crystal element 23 and a condenser lens 24, and then, is reflected twice by a right angle prism 28, and further, is incident upon the compound prism 31. The first lens 21 is movable in a direction perpendicular to the optical axis thereof, and in a direction parallel to the base length direction. An optical axis Ax2 of the second objective optical system 20 is deflected due to the decentering of the first lens 21. In other words, the first lens 21 functions to deflect the optical axis Ax2 in the second embodiment.

Optical elements, along an optical path from the mirror 27 to the compound prism 31, are arranged as shown in FIG. 9. Light incident on the objective optical systems 10 and 20 is reflected twice by reflection planes which invert a direction of an image in a lateral direction, and is reflected twice by reflection planes which invert a direction of an image in a vertical direction, and then, is incident upon the photographer's eye via an eyepiece lens 42 (shown in FIG. 8). Similar to the first embodiment shown in FIG. 1, by controlling the liquid crystal element 23, a dual image area can be defined at an arbitrary position within the finder field. Further, by controlling a displacement of the first lens 21 of the second objective optical system 20 based on the object distance and the coordinate (i.e., a position within the finder field) of the dual image area, degree of coincidence of the superimposed images can be changed appropriately, and therefore, it is possible that the focusing condition of the photographing lens can be monitored via the finder.

When photographing is carried out, as shown in FIG. 10(B), the quick return mirror 13a is retracted from the optical path. Accordingly, the light passed through the first objective optical system 10 is all incident on a film 15, so that the film 15 can be exposed. The displacement amount "w" of the first lens 21 for making the optical axis Ax2 deflect by θ1 is obtained from the following equation.

$$w = fo \tan θ1/(m'-m)$$

where, m is a lateral magnification up to the primary image plane of the second objective optical system including the first lens 21;

m' is a lateral magnification up to the primary image plane of the second objective optical system which does not include the first lens 21 (the second objective optical system including a plurality of lenses); and fo is a focal length of the second objective optical system.

With use of the finder system 200 according to the second embodiment, a thickness, in a direction of an optical axis, of a camera can be made small. Further, the base length between the first objective optical system 10 and the second objective optical system 20 can be made long, so that a confirmation accuracy of the focusing condition can be enhanced. Furthermore, when the quick return mirror 13a is retracted from the optical path, by making the overall range of the liquid crystal element 23 is made into a transmission state, it is possible to prevent a finder view from disappearing, which is considered to be a disadvantage in an ordinary single lens reflex cameras utilizing a quick return mirror.

FIG. 11 to FIG. 13 show an optical system 300 according to a third embodiment of the present invention. In this embodiment, a variable apical angle prism is used as an optical path deflection element, and each of the first and second objective optical systems 10 and 20 is constructed such that the magnification thereof is variable. The first objective optical system 10 includes a negative first lens 11a and a positive second lens 11b, and is constructed such that a focal length thereof is variable by moving the lenses 11a and 11b in an optical axis direction. Light incident from the first objective optical system 10 is incident on a mirror 13 via a condenser lens 14, and reflected thereby. Then, the light reflected by the mirror 13 is incident upon a first compound prism 32 which functions as light combining element.

The second objective optical system 20 includes a variable apical angle prism 29 which is located on the object side of the optical system 20. The variable apical angle prism 29 functions as an optical path deflection element. A negative first lens 21a and a positive lens 21b having the same construction as the lenses 11a and 11b of the first objective optical system 10 are provided. The variable apical angle prism 29 is constructed such that a circumference of two opposing optical glass plates is surround with a bellows-like elastic member, and a transparent liquid is encapsulated therein. By varying an apical angle of the prism 29, the optical axis Ax2 is deflected. If the deflection angle of the optical axis Ax2 is small such that it is possible to approximate a sine of an angle as an angle itself, a refractive index of a transparent substance encapsulated in the variable apical angle prism 29 is represented by "n". In order to deflect the optical axis by an angle θ1, an apical angle γ of the prism 29 to be set is obtained from the following equation.

$$γ = θ1/(n-1)$$

Light incident through the second objective optical system 20 is reflected by a mirror 22a, and then, is incident upon a second compound prism 33 via a liquid crystal element 23 and a condenser lens 24. The first and second compound prisms 32 and 33 are arranged as shown in FIG. 12. Specifically, the second compound prism 33 is constructed such that two right angle prisms 33a and 33b are combined, and the first compound prism 32 is constructed such that a right angle prism 32a and a cubic half mirror prism 32b are combined.

The light incident on the first objective optical system 10 is reflected twice by the right angle prism 32a of the first compound prism 33. Subsequently, a part of the light is reflected by the half mirror prism 32b, and then, is incident on an eyepiece lens 42. Light incident on the second objective optical system 20 is reflected three times by the second compound prism 33. Subsequently, a part of the light passes through the half mirror prism 32b of the first compound prism 32, and then, is incident upon the eyepiece lens 42. Therefore, the light from respective first and second objective optical systems 10 and 20 is combined and incident upon the photographer's eye. Like the embodiment of FIG. 1 described before, by controlling the liquid crystal element 23, it is possible to define the dual image area on an arbitrary position within the finder field. Further, by controlling the apical angle of the variable apical angle prism 29 of the second objective optical system 20 based on the object distance and the coordinate of the dual image area within the finder field, it is possible to monitor the focusing condition of the photographing lens in accordance with the degree of coincidence of the superimposed images via the finder.

According to the third embodiment, the first and second objective optical systems 10 and 20 are constructed such that the first and second lenses are movable along the optical axis so as to vary a focal length thereof synchronously with zooming movement of a photographing optical system (not shown) which is provided independently from the finder optical system. Specifically, as shown in FIG. 11, a mechanism for varying the magnification of the finder system 300 is provided with a drive gear 61 which is fixed onto a zoom motor (not shown), a driven gear 62 which meshes with the drive gear 61, and a cam plate 70 which is formed with a rack 71 meshing with the driven gear 61 at one side thereof, and is slidably moved in the right-hand and left-hand direction in the drawing, that is, in the base length direction.

The first and second lenses of respective objective optical systems 10 and 20 are supported on a movable lens frame which is provided with a cam follower. The cam plate 70 is formed with cam grooves 72a, 72b, 73a and 73b into which the cam followers provided on the respective lens frames are fitted. The cam grooves 72a and 73a for driving the first lenses 11a and 21a are formed to have a predetermined curve; and each of the cam grooves 72b and 73b for driving the second lenses 11b and 21b of the objective optical systems is formed to have a straight line as shown in FIG. 11. When the cam plate 70 is moved by the zoom motor, the first lenses and the second lenses of the first and second objective optical systems are moved along the optical axis, and focal lengths of respective objective optical systems are varied synchronously.

FIG. 11 shows an arrangement of the lenses at a wide extremity when the focal lengths are the shortest; and FIG. 13 shows an arrangement at a telephoto extremity when the focal lengths are the longest.

Recent single lens reflex cameras are generally provided with an automatic focusing function. In cameras having the automatic focusing function, there are cameras which have a so-called multi-point measuring type autofocus function, i.e., cameras which are capable of measuring a plurality of object distances with respect to a plurality of detection zones within a finder field. The finder according to the present invention can be applied to a camera having the aforesaid multi-point measuring type autofocus function in a manner described below. The dual image area is determined so as to include or correspond to one of the distance measuring zones which includes the object to be focused. Then, based on the distance information corresponding to the determined zone included in the dual image area, the rotatable mirror is driven. With this control, it is possible to confirm whether focusing is accurately carried out, or the photographing lens is located at an in-focus position with respect to the object located within the distance measuring zone by the degree of coincidence of the superimposed images within the dual image area.

As described above, according to the present invention, it is possible to form the superimposed images on an arbitrary position within the finder field. Accordingly, focusing condition can be confirmed with respect to an object located not only at a central portion but also at peripheral portions of the finder field.

The present disclosure relates to subject matter contained in Japanese Patent Application No. HEI 09-74496, filed on Mar. 11, 1997, which is expressly incorporated herein by reference in its entirety.

What is claimed is:

1. A finder system for a camera, comprising:
   a real-image type first objective optical system;
   a real-image type second objective optical system, said second objective optical system being apart from said first objective optical system by a predetermined base length;
   a light combining element which composes light passed through said first and second objective optical systems to form superimposed images;
   an eyepiece optical system which guides light combined by said light combining element to a photographer's eye;
   an optical path deflection element which varies an angle of an optical axis of said second objective optical system with respect to an optical axis of said first objective optical system to vary degree of coincidence said superimposed images along said base length;
   a light transmission area defining element which is arranged in an optical path of said second objective optical system, said light transmission area defining element defining an area through which light entered said second objective optical system is allowed to transmit;
   a dual image area selection device which selects a dual image position, within which said superimposed images are observable, within a finder field, said dual image selection device controls said light transmission area defining element to define said light transmission area at a position corresponding to said dual image area;
   an object distance information detection device which detects information related to an object distance; and
   a controller which controls said optical path deflection element so that said superimposed images, which are formed by light incident from said first and second objective optical systems, of said object located at detected object distance coincide with each other based on a position within said finder field of said light transmission area set by said selection device and information related to said object distance output by said object distance information detection device.

2. The finder system according to claim 1, wherein said light transmission area setting element is arranged in the vicinity of an image plane of said second objective optical system.

3. The finder system according to claim 1, wherein said first and second objective optical systems have substantially an identical lens construction.

4. The finder system according to any of claim 1, further including a magnification changing system which simultaneously varies magnification of said first and second objective optical systems in accordance with a variation of a focal length of a photographing optical system of said camera.

5. The finder system according to claim 1, wherein said optical path deflection device includes a rotatable mirror, and a mirror driver for driving said movable mirror to rotate.

6. The finder system according to claim 1, wherein said optical path deflection device further includes a variable apical angle prism.

7. The finder system according to claim 1, wherein said optical path deflection device includes at least a lens of said second objective optical system movable in a direction perpendicular to an axis which is an optical axis of said second objective optical system when said optical axis of said second objective optical axis is not deflected by said optical path deflection element.

8. The finder system according to claim 7, wherein said at least a lens of said objective optical system is movable in said base length direction.

9. The finder system according to claim 1, wherein said light transmission area defining element is a liquid crystal element, a partial area corresponding to said dual image area allows light to pass through, the other area prevents light from being transmitted.

10. The finder system according to claim 1, wherein said object distance information detection device is a distance measuring device.

11. The finder system according to claim 1, wherein a relay lens system is provided between said eyepiece optical system and each of said first and second objective optical systems, said relay lens relaying a primary image of an object formed by each of said first and second objective systems so as to form a secondary image.

12. The finder system according to claim 1, wherein said camera is a single lens reflex camera, and wherein said first objective optical system comprises an objective lens of a photographing optical system of said single lens reflex camera.

13. The finder system according to claim 12, wherein an optical path switching element is provided between said first objective optical system and said light combining element, said optical path switching element being movable to be located at a first position and a second position, light incident through said first objective optical system being directed to a photographic recording medium when said optical path switching element is located at said first position, light incident through said first objective optical system being directed to said light combining element when said optical path switching element is located at said second position.

14. The finder system according to claim 13, wherein said optical path switching element is a quick return mirror of said single lens reflex camera.

15. The finder system according to claim 13, wherein said selection means controls said light transmission area defining element so that light incident from said second objective optical system is transmitted in an overall area of said light transmission area defining element when said optical path switching element is located at said first position.

16. The finder system according to claim 1, further comprising another optical path deflection element which varies an angle of an optical axis of said second objective optical system with respect to an optical axis of said first objective optical system in a direction perpendicular to a base length direction.

* * * * *

UNITED STATES PATENT AND TRADEMARK OFFICE
CERTIFICATE OF CORRECTION

PATENT NO. : 6,035,140
DATED : March 7, 2000
INVENTOR(S) : Sachio Hasushita

It is certified that error appears in the above-identified patent and that said Letters Patent is hereby corrected as shown below:

Column 15, line 5, after "to the finder." insert --In other words, the camera includes a portion constructed like a single lens reflex camera, i.e., the camera comprises a single lens reflex camera.--

Column 18, line 53, delete "any of".

Column 19, line 22, change "is" to --comprises--.

Signed and Sealed this

Eleventh Day of July, 2000

*Attest:*

*Attesting Officer*

Q. TODD DICKINSON
*Director of Patents and Trademarks*